(12) United States Patent
Simon et al.

(10) Patent No.: US 11,987,347 B2
(45) Date of Patent: May 21, 2024

(54) SINGLE-BLADE AIRCRAFT ROTOR

(71) Applicants: INNOSTAR, Chatillon (FR); HUTCHINSON, Paris (FR)

(72) Inventors: Jean-Michel Simon, Chatillon (FR); Louis Chemouni, Verneuil-sur-Seine (FR)

(73) Assignees: INNOSTAR, Chatillon (FR); HUTCHINSON, Paris (FR)

( * ) Notice: Subject to any disclaimer, the term of this patent is extended or adjusted under 35 U.S.C. 154(b) by 0 days.

(21) Appl. No.: 17/774,285

(22) PCT Filed: Nov. 4, 2020

(86) PCT No.: PCT/EP2020/080951
§ 371 (c)(1),
(2) Date: May 4, 2022

(87) PCT Pub. No.: WO2021/089616
PCT Pub. Date: May 14, 2021

(65) Prior Publication Data
US 2022/0388641 A1   Dec. 8, 2022

(30) Foreign Application Priority Data
Nov. 4, 2019 (FR) .................................. 1912342

(51) Int. Cl.
*B64C 27/473* (2006.01)
*B64C 27/00* (2006.01)
*B64C 27/43* (2006.01)
*B64C 27/51* (2006.01)

(52) U.S. Cl.
CPC ............ *B64C 27/43* (2013.01); *B64C 27/001* (2013.01); *B64C 27/473* (2013.01); *B64C 27/51* (2013.01); *B64C 2027/005* (2013.01)

(58) Field of Classification Search
CPC ....... B64C 27/001; B64C 27/51; B64C 27/43; B64C 27/473
See application file for complete search history.

(56) References Cited

U.S. PATENT DOCUMENTS

| 4,239,455 A | 12/1980 | Broekhuizen et al. |
| 6,619,585 B1 | 9/2003 | Lidak |
| 9,889,925 B2 * | 2/2018 | Rawdon .................. B64C 11/00 |
| 2018/0222579 A1 | 8/2018 | Simon |

* cited by examiner

*Primary Examiner* — Michael L Sehn
(74) *Attorney, Agent, or Firm* — Muncy, Geissler, Olds & Lowe, P.C.

(57) ABSTRACT

A rotor for a rotary wing aircraft having a single blade with a longitudinal pitch axis and that is hinge mounted on the rotary shaft for rotating the rotor, the hinge being about an axis that is transversal relative to the rotary shaft, said rotary wing describing a cone when its pitch angle is not zero, the rotor possessing a balancing flyweight device for balancing the resultant of the horizontal component of the lift force and of the rotary drag force of the blade, the device being mounted to rotate with the rotary wing about its rotary shaft and, under the effect of the centrifugal force to which it is subjected while the rotary wing is rotating, generating a horizontal force that is applied to the rotary shaft of the motor and that opposes the above-mentioned resultant with a magnitude of that is a function of the position of the flyweight(s) of the balancing device relative to the rotary shaft of the rotor.

8 Claims, 3 Drawing Sheets

[Fig. 1]
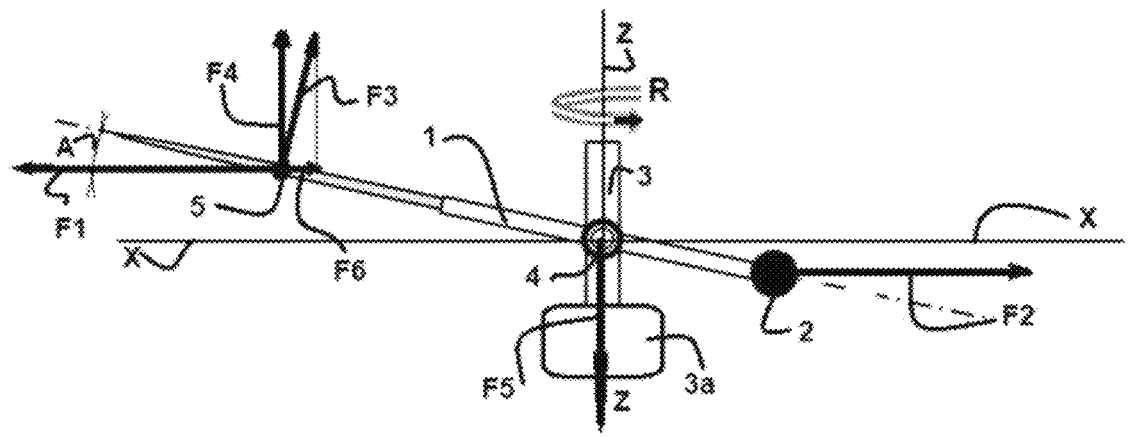
[Fig. 2]
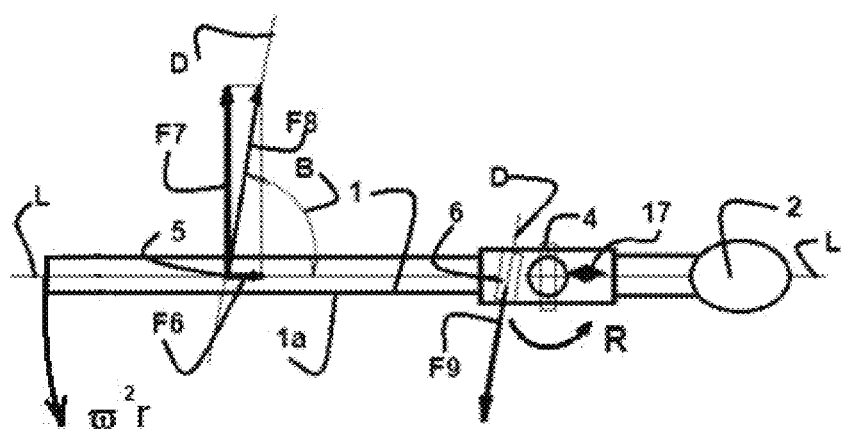

[Fig. 3]
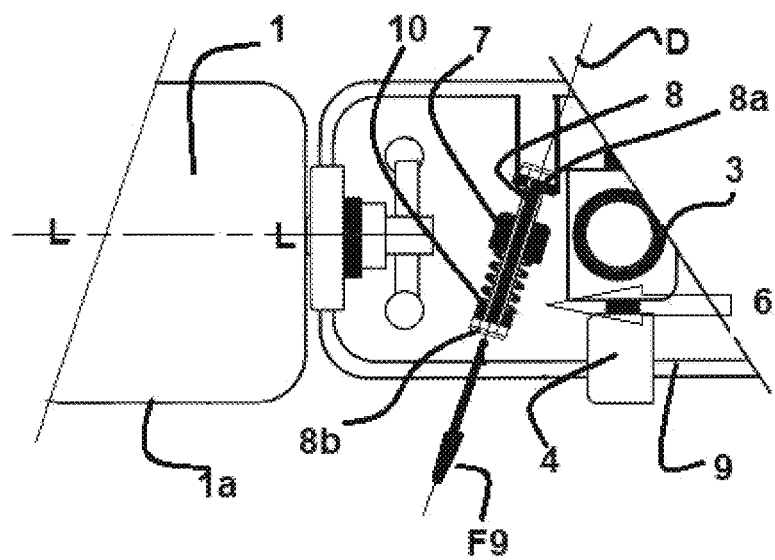
[Fig. 4]
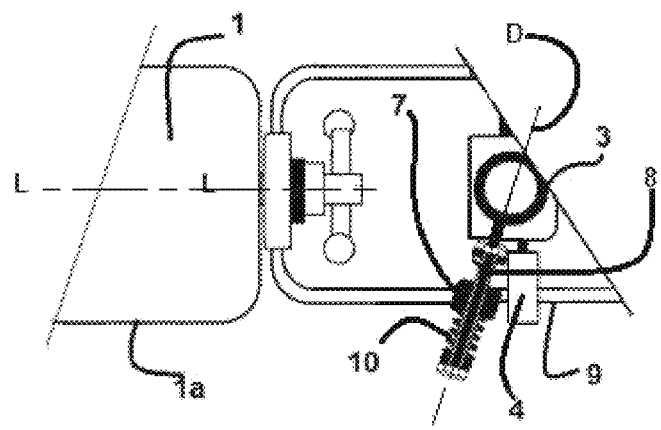

[Fig. 5]
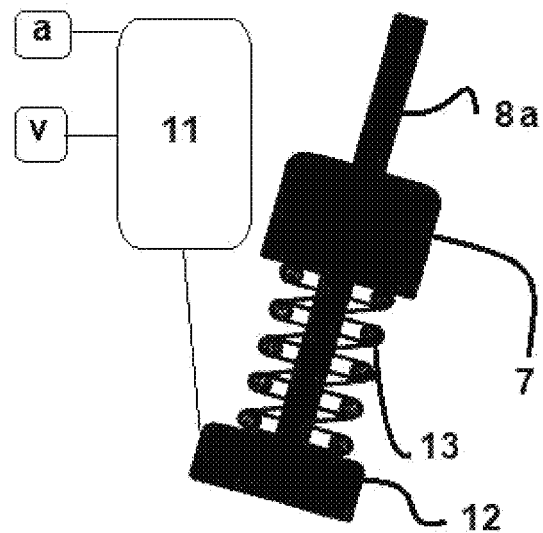
[Fig. 6]
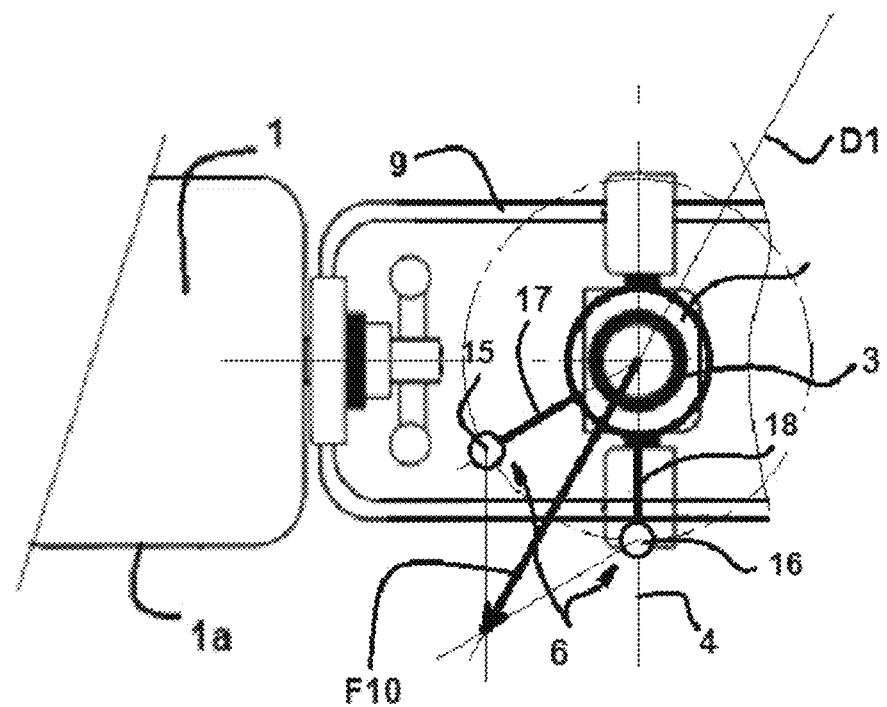

SINGLE-BLADE AIRCRAFT ROTOR

The present invention relates to a rotary wing aircraft rotor having a single blade.

BACKGROUND OF THE INVENTION

Rotors are known in the state of the art that have only a single blade, which is balanced with respect to centrifugal force by a counterweight. Providing the pitch of the blade is zero, and ignoring friction drag, this equilibrium is almost perfect. Things are different when it is desired to impart lift to the rotary wing by acting on the pitch of the blade, since under such circumstances the rotating blade describes a cone having its apex pointing downwards. The lift force exerted on the blade is then inclined at a few degrees towards the axis of the cone. It therefore possesses a vertical component that is compensated by the weight of the aircraft together with a horizontal component that is directed towards the axis of the rotor and that constitutes a force rotating about that axis. This force generates vibration at a frequency equal to the frequency of rotation and at an amplitude that depends, at a constant speed of rotation, on the angle of the cone described by the blade. This vibration is transmitted to the structure of the aircraft in an undesirable manner and rapidly gives rise to considerable amounts of wear on the rotating members in the bearings of the rotor mast and in the bearings themselves.

Solutions to this problem are described in Document U.S. Pat. No. 6,619,585. The general principle of those solutions is to move the center of mass of the rotor relative to its vertical axis of rotation as a function of the value of the angle at the apex of the cone described by the single blade. The mechanisms implemented act on the position of the counterweight, as also described in Document US 2018 222579, which proposes acting on the counterweight in order to adjust the compensation of centrifugal force only, for which the point of application on the single blade varies because of the above-mentioned conical shape. It has been found that such action on the counterweight requires means that are difficult to implement.

Furthermore, the rotary drag of the single blade is an interfering force that is not compensated by the rotary drag of its counterweight. This force, which is perpendicular to the axis of the blade, rotates about the axis of rotation and needs to be balanced dynamically in order to reduce, or even eliminate, the vibration that it generates in the bearings of the rotor.

Furthermore, this force combines with the above-mentioned force and adds to the unbalanced interfering force that is taken up by the structure of the aircraft in an undesirable manner and that increases the risk of rapidly subjecting the rotating members in the bearings of the rotor mast and in the bearings themselves to considerable amounts of wear.

OBJECT OF THE INVENTION

The invention seeks to mitigate those drawbacks by proposing a device for compensating this resultant of the interfering forces made up of the horizontal component of the lift force and the rotary drag acting on the blade.

SUMMARY OF THE INVENTION

To this end, the invention provides a rotor for a rotary wing aircraft having a single blade with a longitudinal pitch axis and that is hinge mounted on the rotary shaft for rotating the rotor, the hinge being about an axis that is transversal relative to the rotary shaft, said rotary wing describing a cone when its pitch angle is not zero. The rotor possesses a balancing flyweight device for balancing the resultant of the horizontal component of the lift force and of the rotary drag force of the single blade, the device being mounted to rotate with the rotary wing about its rotary shaft and, under the effect of the centrifugal force to which it is subjected while the rotary wing is rotating, generating a horizontal force that is applied to the rotary shaft of the motor and that opposes the above-mentioned resultant with a magnitude of that is a function of the position of the flyweight(s) of the balancing device relative to the rotary shaft of the rotor.

When the blade is rotating and providing lift, the effect of this device is to exert a force on the rotary shaft of the rotor that opposes the resultant of the horizontal component of the lift force and of the drag force to which the blade is subjected, which force is transmitted to the shaft either directly or else via the root of the shaft. It can be understood that, for a given speed of rotation, the magnitude of this force depends on the mass(es) and the position(s) of the flyweight(s) and on its or their distance(s) from the axis of rotation. It should also be observed that the speed of rotation, the lift, and the drag of the rotary wing are inter-linked. Thus, in order to obtain a given lift, the pitch angle of the single blade needs to increase at slower speeds, e.g. speeds that are slower than the nominal speed. For example, on takeoff and on landing, it may be appropriate to operate at less than the nominal speed, in particular in order to limit the noise given off by the rotary wing.

Several embodiments of the balancing device are possible. Each of them is determined mainly as a function of the quality and of the precision that it is desired to obtain for the compensation.

Specifically, in certain applications of a single blade, it possesses an angle of attack (or blade pitch) that is practically constant over almost its entire period of operation, and it possesses only two transient operating stages that are very short compared with that period. By way of example, this applies to vertical takeoff aircraft that overfly a land area for surveillance or monitoring in almost stationary manner. In this application, it can be acceptable for the compensation of the interfering force to be imperfect during these transient stages, and thus it can be acceptable for vibration to exist temporarily. The flyweight of a first embodiment of the device of the invention is thus permanently located at the end of an arm extending parallel to the direction of the interfering force that is to be compensated, which arm has its other end fastened to the root of the single blade or to the rotor shaft. In this position that is determined and fixed, the centrifugal force to which the flyweight is subjected compensates the above-mentioned resultant of the interfering forces only during the period of service while the aircraft is hovering. In a variant of that embodiment, it is possible to provide a flyweight that is movable between two positions, a first position on the arm corresponding to no compensation, with the flyweight being locked by a latch or the like that retracts once the blade reaches a certain pitch angle (e.g. 60% to 70% of its nominal pitch angle) so as to allow it to reach a second position on said arm corresponding to relatively effective compensation (about 85% of the resultant of the interfering forces) during periods of service, e.g. with a payload of about 90 percent of the maximum takeoff weight (MTOW). A suitably rated spring serves to return the flyweight from the second position to the first when the pitch angle of the blade returns below the above-mentioned threshold.

In other applications, the single blade operates under conditions that are essentially variable (the collective pitch of the blade being variable and possibly also its speed of rotation), so compensation needs to be adjusted continuously as a function of varying conditions. This adjustment is then obtained by continuously adjusting the position of the flyweight along with the above-mentioned arm, parallel to the direction of the resultant of the interfering forces.

After investigating several relationships for the variation of the parameters that are taken into consideration in order to perform such continuous adjustment, it has been found that the square of the pitch of the blade is a good variable on which to servocontrol the distance of the flyweight from the axis of the rotor in the above-defined direction, which direction has been found to vary little with varying load.

It is important to observe that this square-law relationship (i.e. a function of the square of the pitch of the blade) enables this horizontal interfering force to be balanced well regardless of the loading conditions of the aircraft. The compensation that is obtained is better than 90% of the interfering force.

It is then easy to devise one or more servocontrol mechanisms for implementing this variation relationship.

Consequently, in another embodiment of the invention, the flyweight of the mechanism is mounted to be movable along the direction extending obliquely relative to the longitudinal axis of the single blade in the vicinity of the axis of rotation of the rotor, with an actuator for moving it along this oblique direction being controlled in response to the square of the pitch angle of the single blade.

Thus, in simple manner, the actuator may comprise a threaded rod having an oblique axis along the above-mentioned diverging direction, the flyweight co-operating with the rod in the manner of a screw-and-nut system, a motor secured to the screw to drive it in rotation, and a motor control unit continuously receiving as input information relating to the pitch angle of the blade in order to control the motor appropriately. That mechanism may be associated with a flyweight return member acting in the opposite direction to centrifugal force in order to regulate the drive force that is to be delivered. The threaded rod extends in a direction that is inclined so as to diverge from the leading edge of the single blade, in front of it.

The above applies regardless of the speed of rotation of the rotary wing. Under certain circumstances, it can be useful to vary the speed of rotation, e.g. in order to reduce it relative to the nominal speed in order to reduce the noise given off by the aircraft. Specifically, in order to obtain identical lift, it is then appropriate to increase the pitch of the play, and advantageously, this increase in the pitch angle is taken into account by the relationship for servocontrolling the movement of the flyweight so as to compensate appropriately the drop in the speed of rotation of the single blade.

Mention is also made of another embodiment of the invention in its application to compensating the resultant of the interfering forces. It is constituted by at least one pair of flyweights that rotate synchronously with the blade and in which each flyweight is of angular position that is adjustable about the axis of the rotor shaft. It can be understood that by acting on the position of each flyweight relative firstly to the longitudinal axis of the blade and secondly to the position of the other flyweight, it is possible to create position and mass unbalance that is adjustable and that is subjected to centrifugal force of magnitude and direction that are adjustable as a result, and that opposes the interfering force that is to be compensated.

BRIEF DESCRIPTION OF THE DRAWINGS

The invention can be better understood from the following description and drawings. Reference is made to the figures, in which:

FIG. 1 is a diagram showing the horizontal interfering force to which a single blade (shown in profile) is subjected as a result of the lift of the rotary wing;

FIG. 2 is a diagram, as seen from above, showing the horizontal result of the interfering force due to the lift together with the horizontal force due to the rotary drag of the blade, and also showing the principle of compensation in accordance with the invention;

FIG. 3 is a diagram of an embodiment of a first compensation device of the invention;

FIG. 4 shows a variant of the FIG. 3 embodiment that is adapted to aircraft on small size;

FIG. 5 is a diagram showing an example of means used for controlling the compensation device of FIG. 3 or of FIG. 4; and FIG. 6 is a diagram of another embodiment of the vibration compensation device of the invention.

DETAILED DESCRIPTION OF THE INVENTION

In FIG. 1, there is shown a single blade 1 together with its counterweight 2 in counterclockwise rotation R about the rotor axis ZZ. The rotor (or rotor shaft) 3 is driven by a motor 3a and the blade 1 is hinged freely to the rotor 3 about a transverse axis 4. This blade 1 is not at zero pitch, such that, as shown, the blade 1 describes a cone of angle A on the plane XX perpendicular to the axis ZZ of the rotor, which plane would contain the rotating blade 1 if the pitch of the blade 1 were zero.

The centrifugal forces F1 and F2 that are applied to the center of gravity 5 of the blade 1 and to the center of gravity of the counterweight 2 are opposite and in equilibrium, and the lift force F3 possesses a vertical component F4 that is balanced by the lifted load F5. The lift applied to the counterweight 2 is not shown since it is negligible. In this figure, it can be seen that the horizontal component F6 of the lift is directed towards the rotor 3 and is not compensated.

FIG. 2, which is a view of FIG. 1 seen from above, shows not only the elements that are described above, but also the rotary drag on the blade 1, as represented by F7, with the drag on the counterweight 2 being ignored. The leading edge of the blade 1 is referenced 1a.

FIG. 2 shows that the horizontal force F8, which results from the drag F7 and the horizontal component F6 of the lift acting in combination, is not balanced, thereby leading to interfering vibration being created where the rotor 3 is mounted in the structure of the aircraft and in its bearings.

The force F8 is directed along a direction D that is substantially constant regardless of the value of the load being lifted, and thus regardless of the collective pitch of the blade 1. By simulation, it has been found that this direction D is inclined relative to the longitudinal pitch axis LL single blade 1 at an angle B lying in the range 65 degrees to 80 degrees, preferably in the range 70 degrees to 75 degrees, and in this example equal to 70 degrees. The magnitude of this force depends on the value of the pitch of the blade 1, and calculations show that it depends, to a good approximation, on the value of the square of this collective pitch since the angle A is small (of the order of a few degrees, in the range 2° to 5°).

Thus, in order to compensate the unbalance of this force F8, a device 6 of the invention is shown in FIG. 3 for generating a force F9 on the blade 1 that opposes the force F8. This device comprises a flyweight 7 that is subjected to centrifugal force during rotation of the blade 1. It is mounted to move along a guide 8 having one end 8a that is secured to the blade 1 at its shank, close to the rotor 3. For example, the blade 1 has a U-shaped root 9 that is hinged to the rotor 3 about a transverse axis 4. The device 6 is thus advantageously housed between the branches of this U-shaped root 9. The centrifugal force to which the flyweight 7 is subjected gives rise to the force F9 along the direction of the guide.

The guide 8 extends along a direction D that is inclined relative to the axis by an angle B corresponding to the angle formed relative to this direction by the resultant F8 of the horizontal component F6 of the lift force F3 and of the rotary drag force F7 of the blade 1. This eliminates, or at least perceptibly diminishes, the rotary vibration and stresses to which the rotor 3 is subjected The embodiment shown diagrammatically in FIG. 3 is adapted particularly to aircraft used mainly for hovering flight. The lift of the rotary wing is constant and the force F8 is also constant. The mass of the flyweight 7 is determined so that when it is in its extreme position 8b along the guide 8 beside the leading edge 1a of the blade 1, it compensates the force F8 correctly. It should be observed that for a flyweight 7 that is not controlled by the pitch angle of the blade 1, the flyweight 7 is released from a position close to the rotor axis to go towards its position close to the leading edge of the leg 1 by the rated spring 10 "giving way", or in more general manner, when a latch of the flyweight 7 retracts at the nominal speed of rotation of the blade 1, with the spring 10 serving to return the flyweight 7.

In FIG. 4, there can be seen most of the elements described above with reference to FIG. 3 and they have the same references.

The device for compensating interfering forces then acts directly on the rotor 3 while rotating with the single blade, the guide 8 being a radial rod extending in a direction D and secured to a bearing that is constrained to rotate with the rotor 3.

The mass of the flyweight 7 is determined so that when it is in its position at the end of the guide 8, specifically towards the leading edge 1a of the blade 1, it generates a force F9 that compensates the force F8 correctly.

This configuration is advantageous on small machines where simplicity is sought after.

Under such circumstances, the pitch angle of the blade 1 is advantageously taken to its maximum value once the speed of rotation of the rotor 3 reaches 30% of its nominal speed of rotation, for example.

For an aircraft that is to vary between operating flights and cruising flight, lift varies from one type of flight to the other, since the pitch of the blade 1 also varies. It is then necessary to have a device that adapts to the variations in the force F8, and it should be recalled that this force varies with the square of the pitch angle of the blade 1.

Under such circumstances, and as shown in FIG. 5, movement of the flyweight 7 along the guide 8 is servo controlled by a control unit 11 for controlling a motor 12 that causes the guide 8 to rotate, which guide may for example be a screw, with the flyweight 7 then being a nut that is prevented from rotating and that co-operates with the screw like a screw-and-nut system. Under such circumstances, the spring 13 serves to lighten the load on the motor, in particular in the direction of rotation that leads to an increase in the centrifugal force to which the flyweight is subjected.

In an embodiment that is not shown, the motor could constitute the flyweight itself, cooperating with the guide 8 via an appropriate drive system. The flyweight could also comprise the battery for powering the motor.

The control unit of the motor receives as input a signal "a" corresponding to the instantaneous value of the pitch angle of the blade 1 (which value is averaged over one revolution or over a given length of time) and, in a more elaborate version of the device, it also receives a signal "v" delivered by one or more accelerometers or vibration sensors on the structure that receives the rotor. The control unit 11 then acts on the motor 12 in the direction for minimizing the signal "v". In known manner, the device is situated either on a structural element close to the rotor mast, or else on the rotor mast itself.

Finally, with reference to FIG. 6, there can be seen another embodiment of the compensation device of the invention. It includes at least one pair of flyweights 15 and 16, each carrying by the free end of a respective arm 17 or 18, the other end of the arm being secured to a respective ring 19 (the figure showing only one ring) of axis coinciding with the axis of the rotor 3. Each ring can be positioned angularly relative to the axis of rotation of the rotor 3 and thus relative to the longitudinal axis of the blade 1. It can be understood that the position occupied by each of the flyweights relative to the blade 1 and the angular spacing between the flyweights define the direction D1 and the magnitude of the resultant F10 of the centrifugal forces to which the flyweights are subjected (this direction is the bisector of the angle formed by the two arms 17 and 18, and the magnitude of the resultant F10 is zero the flyweights are diametrically opposite). The compensation can be adjusted as a function of variations in the flying conditions of the aircraft by controlling the positioning of each flyweight by means of an appropriate servo control device, e.g. responsive to variation in the pitch of the blade 1, as mentioned above.

Naturally, the invention is not limited to the embodiments described and covers any variant coming within the ambit of the invention as defined by the claims.

Thus, it would not go beyond the ambit of the invention to provide another pair of flyweights such as the flyweights 15 and 16, should it be necessary to compensate interfering forces of magnitude that would otherwise require flyweights to be installed that are too voluminous.

On the same principle, it would not go beyond the ambit of the invention to provide compensation for interfering forces on a rotary wing in which the counterweight is a short blade that, when in rotation, also possesses a horizontal lift force component, but which is directed towards the end of the blade, and a horizontal drag component that combines with the horizontal lift force component to generate an interfering force along the blade/counterweight opposing the interfering force existing in the direction of the single blade. As a result, because of all of the forces involved (the horizontal components of the lift forces and of the drag forces) being combined, and because of the geometrical shape of the rotary wing (the above-described conical shape being flattened), the flyweights of the flyweight balancing device of the invention are of smaller mass.

The invention claimed is:

1. A rotor for a rotary wing aircraft having a single blade with a longitudinal pitch axis and that is hinge-mounted on a rotary shaft for rotating the rotor, the hinge being about an axis that is transversal relative to the rotary shaft, said rotary wing describing a cone when a pitch angle of the single blade is not zero, the rotor comprises a balancing flyweight device for balancing a resultant of a horizontal component of a lift force and a rotary drag force of the blade, the balancing flyweight device being mounted to rotate with the rotary wing about the rotary shaft, under an effect of a centrifugal force to which the balancing flyweight device is subjected while the rotary wing is rotating, a horizontal force is applied to the rotary shaft of the rotor and opposes the resultant with a magnitude that is a function of a position of a flyweight of the balancing flyweight device relative to the rotary shaft of the rotor.

2. The rotor according to claim 1, wherein the balancing flyweight device has only one balancing flyweight, wherein the flyweight is carried by an arm having one end secured to a root of the blade, the arm extends in front of said longitudinal pitch axis in a direction of a rotation of the blade, and the arm is inclined relative to said longitudinal pitch axis by an angle corresponding to an angle formed relative to said longitudinal pitch axis by said resultant.

3. The rotor according to claim 2, wherein the flyweight is fastened to the arm in a position that is determined so that a compensation force that is obtained in the position compensates the resultant exactly only for a nominal pitch angle of the single blade.

4. The rotor according to claim 2, wherein the flyweight is adjustable in a position along the arm.

5. The rotor according to claim 4, wherein the flyweight is coupled to a control member for controlling the flyweight's movement along the arm in proportion to a square of the pitch angle of the single blade.

6. The rotor according to claim 2, wherein an axis of the arm intersects an axis of the rotary shaft of the rotor.

7. The rotor according to claim 2, wherein the angle formed between the arm and the longitudinal pitch axis lies in a range of 65 degrees to 80 degrees.

8. The rotor according to claim 1, wherein the balancing flyweight device includes at least one pair of flyweights arranged at free ends of respective arms that rotate synchronously with the blade and that are of angular positions that are adjustable about an axis of the rotor shaft.

* * * * *